(No Model.)  3 Sheets—Sheet 1.

J. F. HAY.
MOLDING APPARATUS.

No. 546,736.  Patented Sept. 24, 1895.

WITNESSES:

INVENTOR
John. F. Hay
BY Hallock & Lord
ATTORNEYS.

(No Model.) 3 Sheets—Sheet 2.

J. F. HAY.
MOLDING APPARATUS.

No. 546,736. Patented Sept. 24, 1895.

WITNESSES:

INVENTOR
John F. Hay
BY
Hallock Bond
ATTORNEYS (No Model.)
3 Sheets—Sheet 3.
J. F. HAY.
MOLDING APPARATUS.
No. 546,736. Patented Sept. 24, 1895.
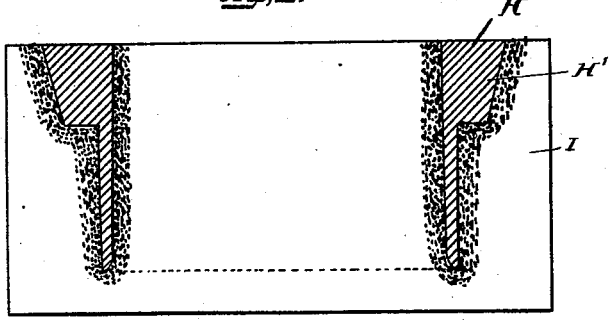
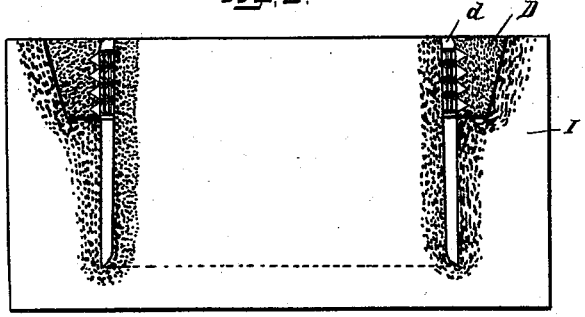
WITNESSES:
INVENTOR
John F. Hay.
BY
Hallock Lord
ATTORNEYS

UNITED STATES PATENT OFFICE.

JOHN F. HAY, OF ERIE, PENNSYLVANIA, ASSIGNOR TO THE ERIE MALLEABLE IRON COMPANY, LIMITED, OF SAME PLACE.

MOLDING APPARATUS.

SPECIFICATION forming part of Letters Patent No. 546,736, dated September 24, 1895.

Application filed March 8, 1895. Serial No. 540,969. (No model.)

*To all whom it may concern:*

Be it known that I, JOHN F. HAY, a citizen of the United States, residing at Erie, in the county of Erie and State of Pennsylvania, have invented certain new and useful Improvements in Apparatus for Forming Mold-Sections for Casting Metal Articles Having an Embossed or Indented Annular Surface; and I do hereby declare the following to be a full, clear, and exact description of the invention, such as will enable others skilled in the art to which it appertains to make and use the same.

This invention relates to an apparatus for forming mold-sections for casting metal articles having indented or embossed surfaces; and it consists in certain improvements in the construction thereof, as will be hereinafter fully described, and pointed out in the claims.

As illustrated in my invention, an apparatus is shown for making hub-bands having embossed patterns at their outer ends.

Figure 1:
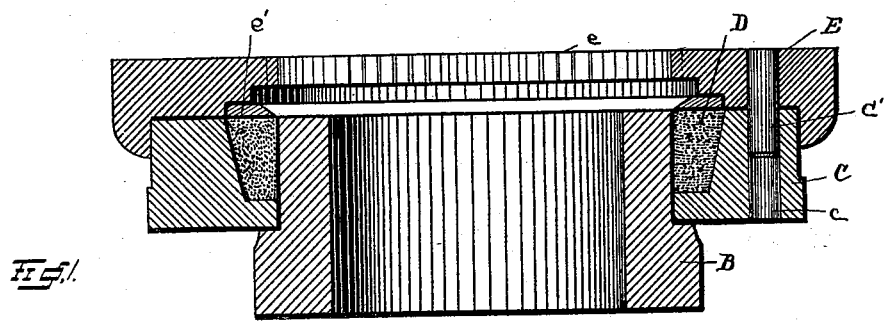
Figure 2:
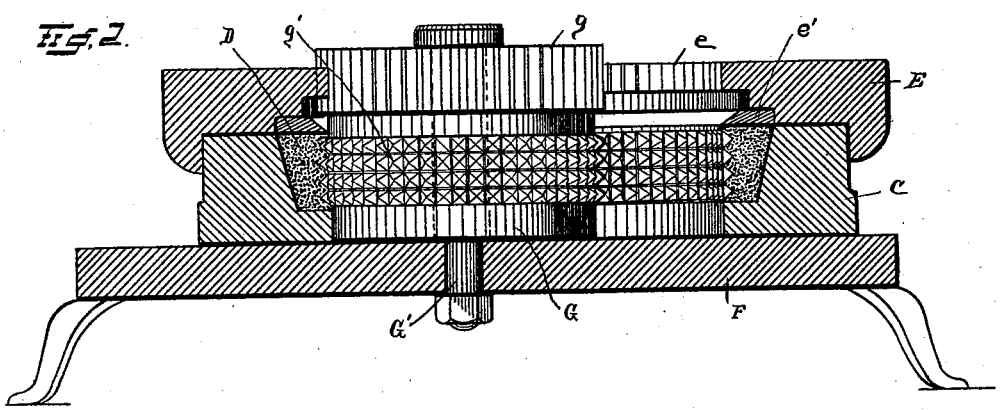
Figure 4:
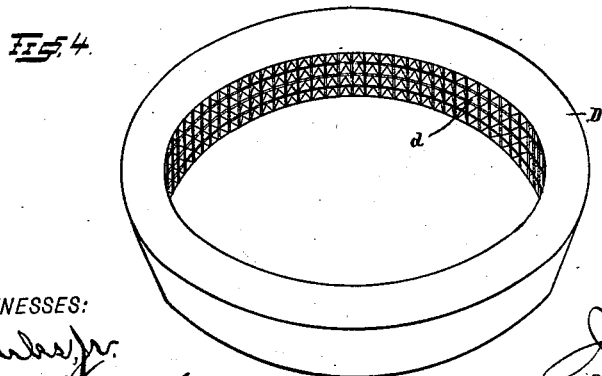
Figure 3:
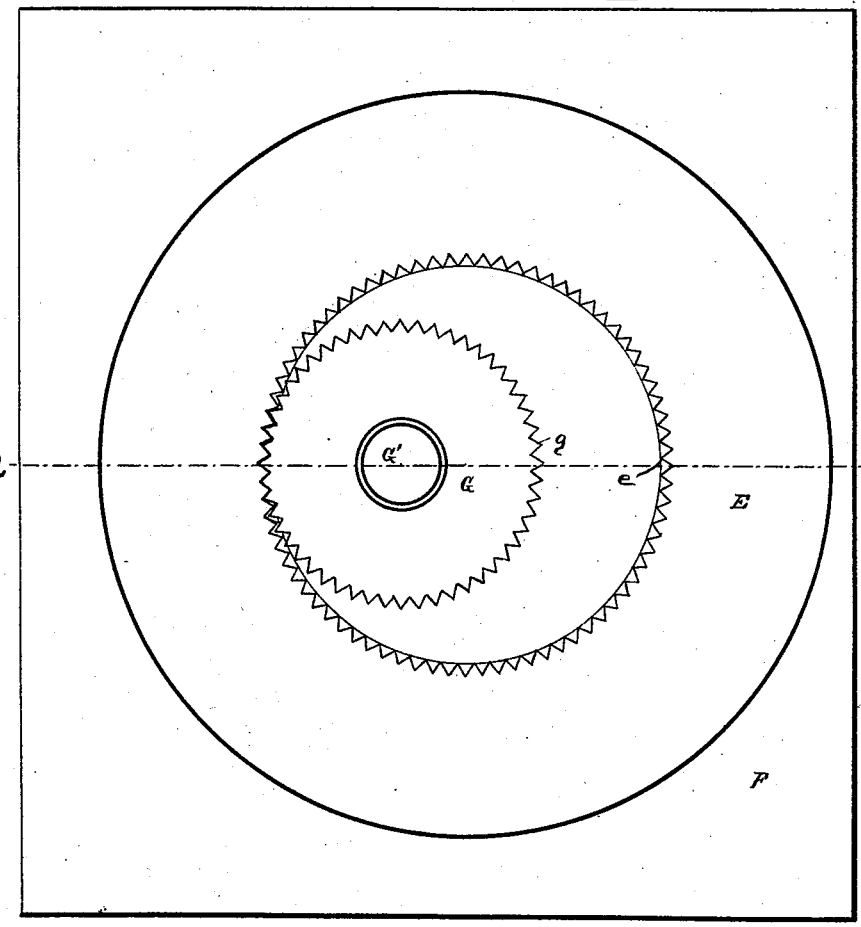
Figure 7:
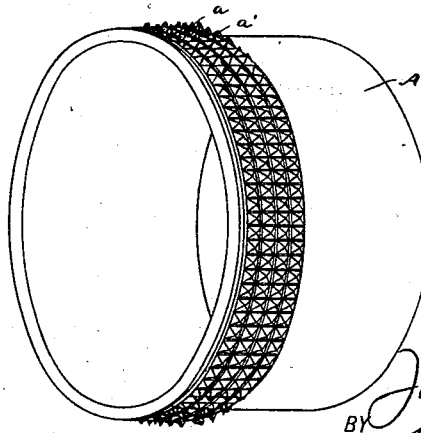

In the accompanying drawings, Figure 1 shows a section of the mold-forming apparatus, showing the first step in the process of forming the mold-sections containing the indented or embossed surface of the mold. Fig. 2 shows a section on the line 2 2 in Fig. 3 of the mold-forming apparatus containing the parts used in the second step. Fig. 3 shows a plan of the parts shown in Fig. 2. Fig. 4 shows the indenting or embossing mold-section. Fig. 5 shows a part of a mold with the pattern in place. Fig. 6 shows the same part of the mold with the pattern drawn and the mold-section in place. Fig. 7 shows a hub-band as produced by a casting in the mold shown in Fig. 6.

A marks the cast article, in this instance the hub-band, $a$, the embossed bead, and $a'$ the protuberances of the embossed surface.

In the first step of forming a mold-section D the sand, preferably such as is used in forming cores, is rammed into a flask C around a former B. A cap part E is then placed over the flask. These parts C and E are doweled together, as indicated by the hole $c$ and dowel $c'$, so as to lock them against turning on themselves. The cap E is also provided with an internal gear $e$. The parts C and E are then lifted from the central portion and placed on a platform F. This platform F has a revolving die G journaled on a post G', which extends upwardly from the platform. The revolving die has a gear $g$, which is adapted to mesh with the internal gear $e$ when the parts E and C are placed on the platform. The die has also a die-surface $g'$, provided with protuberances or indentures in the configuration it is desired the cast article shall have, and this die-surface extends around the die at the same height from the platform as the mold-section D. From the foregoing it will be seen that the table acts as a guide to keep the die directly opposite the mold-section and the gears opposite each other. The gears are then brought into mesh and the die-surface against the surface of the mold-section by movement in a radial direction. The parts E and C are then swung by hand orbitally around the die, keeping the gears in mesh. The die prints the desired configuration in the mold-section and the gears make the movement positive, so that the pattern comes out evenly at the end of the revolution of the parts, and while one revolution will ordinarily suffice several revolutions may be made and the gears will make a positive relative movement of the parts, so that the pattern on the die will accurately repeat itself. A ring $e'$, here shown as a separate piece, but which may be integral with the cap E, determines the depth to which the die can be pressed, the die above the pattern-surface coming in contact with it as the operation is completed. The mold-section is then removed and is in appearance as shown in Fig. 4.

Fig. 5 shows the form of the pattern H, with the print H', and Fig. 6 shows the mold with the pattern drawn and the mold-section D in place.

It will readily be seen that with any of the common methods of molding the article shown in Fig. 7 could not be produced, as the protuberances $a'$ extending in many diverging directions would not permit of the direct use of a pattern of this shape.

It is manifest that the apparatus may be operative for forming mold-sections for casting articles of other than those of the true annular shape, the essential feature being that the mold-section, either as one piece or in segment, form a complete surface of revolution.

What I claim as new is—

1. In an apparatus for forming mold sections for casting metal articles with embossed or indented patterns thereon, the combination of a flask for holding a mold section having an annular surface thereon; an annular gear carried by said flask; a die having an embossed or indented pattern surface thereon of a diameter different from said flask and mold section and adapted to be brought into opposition to a mold section in place in said flask, and to impress the pattern on said mold section by rotative movement; a gear on said die which meshes with the gear on the flask when the mold section and die are in contact; and a guide for maintaining said gears and mold section and die in the same relative planes during the rotative movement.

2. In an apparatus for forming mold sections for casting metal articles with embossed or indented patterns thereon, the combination of a flask for holding a mold section having an annular surface therein; an annular gear carried by said flask, a die having an annular indented or embossed pattern thereon of less diameter than said flask and mold section and adapted to be brought into opposition with a mold section in place in said flask and to impress the pattern on the mold section by rotative movement; a gear on said die which meshes the gear on the flask when the mold section and die are in contact; and a guide on which said die is mounted which maintains the gears, mold section and die in the same relative planes during the rotative movement.

3. In an apparatus for forming mold sections for casting metal articles with embossed or indented patterns therein, the combination of the guide table F; the die G having a pattern surface $g'$ and a gear $g$ thereon; the flask C having the mold section holding cavity therein; and the cap part E doweled to said flask C and having the gear $e$ therein, said mold section holding cavity and gear $e$ being at such height from the table as to be brought into opposition to the pattern surface $g'$ and gear $g$ when the flask C is placed on the table F.

In testimony whereof I affix my signature in presence of two witnesses.

JOHN F. HAY.

Witnesses:
BENJAMIN J. WALKER,
HENRY E. FISH.